United States Patent [19]

Florian

[11] Patent Number: 4,519,639
[45] Date of Patent: May 28, 1985

[54] HINGED FLANGE FOR TAILPIPES AND THE LIKE

[75] Inventor: Roy S. Florian, Southington, Conn.

[73] Assignee: Nickson Industries, Inc., Plainville, Conn.

[21] Appl. No.: 510,434

[22] Filed: Jul. 1, 1983

[51] Int. Cl.³ ............................................. F16L 23/00
[52] U.S. Cl. ..................................... 285/415; 285/412
[58] Field of Search ............... 285/415, 337, 413, 414, 285/412, 368

[56] References Cited

U.S. PATENT DOCUMENTS

| | | | |
|---|---|---|---|
| 432,318 | 7/1890 | Mathews | 285/368 |
| 693,367 | 2/1902 | Brooke | 285/368 X |
| 961,987 | 6/1910 | Rust | 285/412 |
| 1,784,667 | 12/1930 | Gillet | 285/415 X |
| 2,764,431 | 9/1956 | Wilde | 285/415 |
| 2,911,239 | 11/1959 | Marzolf | 285/415 |
| 3,332,710 | 7/1967 | Doty | 285/368 X |
| 3,761,114 | 9/1973 | Blakeley | 285/415 X |
| 3,895,833 | 7/1975 | Thiessen | 285/413 |
| 4,170,260 | 10/1979 | Rudd et al. | 285/413 X |

FOREIGN PATENT DOCUMENTS 1195033 11/1959 France ............................... 285/412

Primary Examiner—Richard J. Scanlan, Jr.

[57] ABSTRACT

A split flange for coupling flanged pipes of an exhaust system of the like includes a pair of laminated clamp members of arcuate configuration each comprised of at least three sheet metal arcuate segments which are staggered in overlying relationship so as to provide end portions in which laminae are spaced apart. The end portions of the two clamp members are interfitted and are provided with aligned apertures through which fasteners extend for assembly of the two clamp members and with an associated clamping element to clamp the flanged pipes together.

3 Claims, 3 Drawing Figures

HINGED FLANGE FOR TAILPIPES AND THE LIKE

BACKGROUND OF THE INVENTION

In exhaust systems and in other conduits, pipes having interfitting or abutting flanges are frequently employed with fasteners extending through the flanges to secure the conduit members in assembly. In some instances, separate clamp elements are used to clamp the conduit members in assembly by the firm engagement of their inner arcuate surfaces with the surface of the flange remote from the joint.

In some instances, particularly catalytic converters and like items operated at relatively high temperature and under corrosive conditions, the flange will burnout, corrode or become otherwise weakened so that the apertures in the flange will no longer permit secure interengagement by fasteners directly seated therein. In such circumstances, an auxiliary coupling member is required to effectively secure engagement.

It is an object of the present invention to provide a novel split flange for coupling flanged conduit members, and which may be assembled readily to the conduits members to provide a secure assembly.

It is also an object to provide such a split flange which will afford good heat dissipation characteristics both for itself and the conduit upon which seated.

Another object is to provide such a split flange which may be readily and relatively economically fabricated and which is rugged and long-lived.

SUMMARY OF THE INVENTION

It has now been found that the foregoing and related objects may be readily attained in a split flange for coupling flanged conduits of an exhaust system or the like, which includes a pair of laminated clamp members of generally arcuate configuration and each including at least three similarly configured and dimensioned sheet metal arcuate segments disposed in overlying relationship to provide laminae. Alternating segments are arcuately displaced relative to the adjacent segments so as to project beyond one end of the adjacent segments and terminate inwardly from the other end of the adjacent segments, which end portions project therebeyond to provide end portions at each end of the clamp member comprised of some of said segments. A plurality of fasteners means are spaced along the length of the sheet metal segments between the projecting end portions and secure the overlying segments in assembly.

The pair of clamp members are disposed with the arcs circumscribed thereby disposed in opposition and with the laminae of the end portions of the clamp members interfitting. The end portions of the interfitting clamp members have aligned apertures therein, and fastening means are seated in the aligned apertures of the clamp members to secure the clamp members in assembly and circumscribing a generally circular space. At least one of the fastening means is releasably engageable and removable to permit the clamp members to pivot about the other of the fastening means.

In the preferred embodiment, the end portions projecting beyond the ends of the adjacent laminar segments are of enlarged width relative to the body portion of the segments. Each of the clamp members includes five arcuate segments, and the fastener means securing the arcuate segments together comprise rivets.

BRIEF DESCRIPTION OF THE DRAWINGS

FIG. 2 is a front elevational view thereof with the clamp members shown in full line in the closed position and with the fasteners omitted for clarity of illustration, one of the clamp members being shown in phantom line in a pivoted open position to permit placement about a pipe or the like.

DETAILED DESCRIPTION OF THE ILLUSTRATED EMBODIMENT

Figure 1:
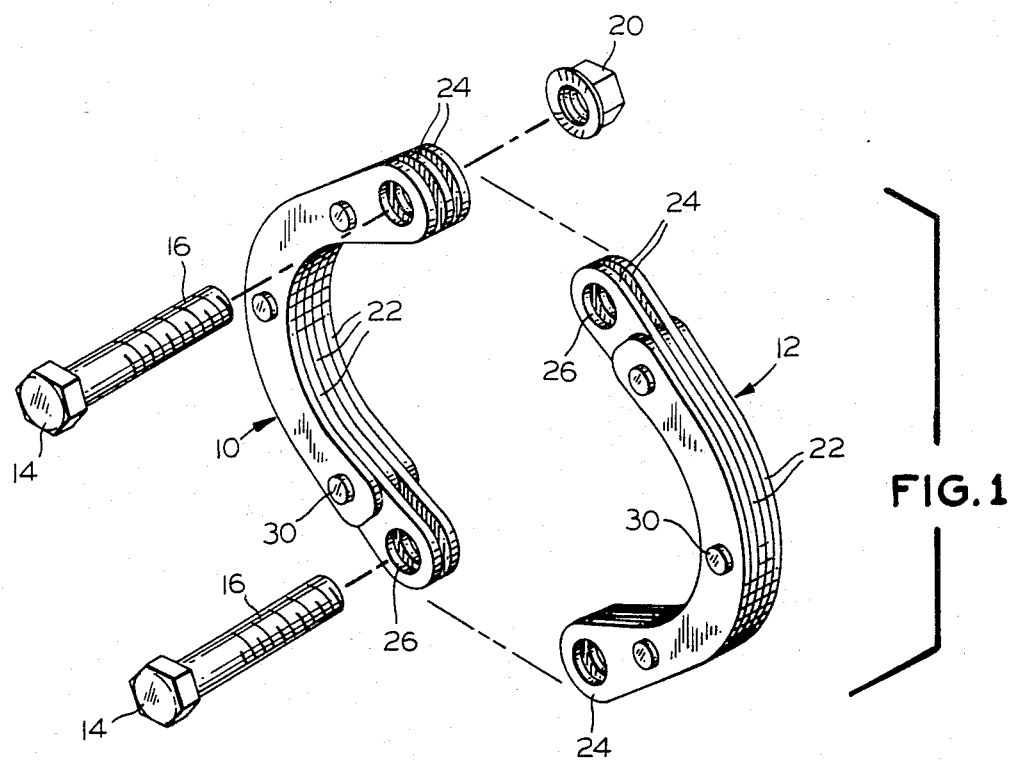
FIG. 1 is an exploded perspective view of a split flange embodying the present invention.
Figure 2:
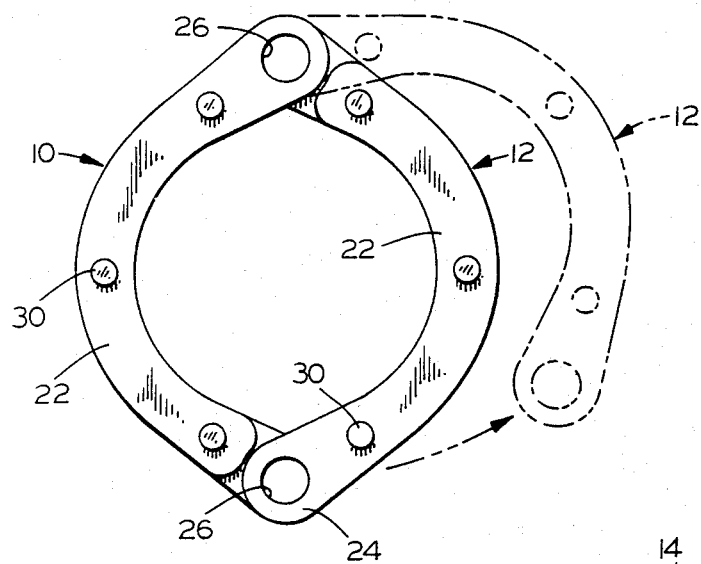

Turning now in detail the attached drawings, therein illustrated is a split flange embodying the present invention and generally comprised of a pair of arcuate laminated clamp members generally designated by the numerals 10 and 12 and secured together by fasteners comprised of bolts having a head 14 and an elongated shank 16, and a nut 20 threadably engageable thereon. The clamp members 10,12 are of essentially identical laminas construction and are each comprised of five arcuate sheet metal segments 22 disposed so that alternate segments are displaced arcuately relative to the adjacent segments, thus providing end portions 24 each comprised of alternate segments. The end portions 24 are of slightly enlarged width and contain aligned apertures 26 therein. The overlying portions of the arcuate segments are secured together by three rivets 30 which are spaced along the length of the body portion thereof intermediate the projecting end portions 24.

When assembled, the projecting end portions 24 of two segments 22 at the upper end of the clamp member 12 will fit within the three projecting end portions 24 at the upper end of the clamp member 10. Similarly, the two projecting end portions 24 at the bottom of the clamp member 10 will interfit within the three projecting end portions 24 at the bottom of the clamp member 12, thus providing a laminar structure comprised of five segments substantially throughout the entire flange. To secure the members in assembly, the shank 16 of the fasteners extend through the aligned apertures 26 in the fashion indicated in FIG. 3.

Figure 3:
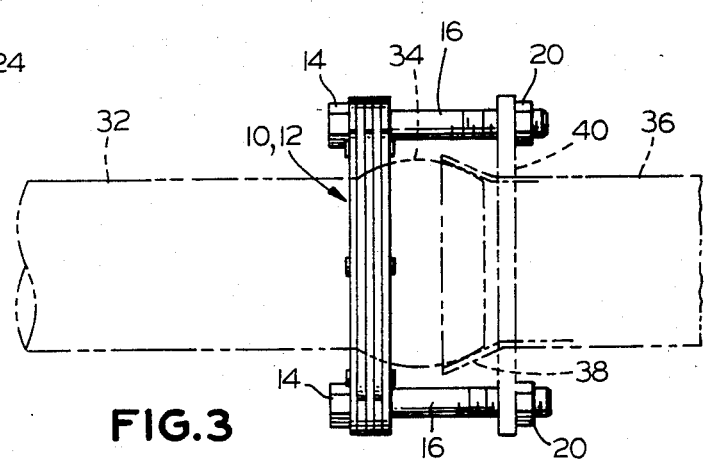
FIG. 3 is a side elevational view of the flange in assembly with a pair of pipe elements both shown in phantom line and engaged with a flange plate also in phantom line.

Turning specifically to FIG. 3, therein illustrated in a semi-diagrammatic fashion are a pair of pipes 32,36 which have interfitting flanges 34 and 38 respectively. To secure the flanges 34,38 of the pipes 32,36 in assembly, the split flange of the present invention is placed about the pipe 32 abutting the flange 34. In the illustrated assembly, a separate clamp plate 40 is placed about the pipe 36 abutting the flange 38. The fasteners of the split flange extend through aligned apertures in the clamp plate 40 and the nuts 18 are tightened thereagainst to draw the split flange and clamping plate 40 tightly against the respective flanges 34,38 and thereby secure the pipes 32,36 in firm assembly. Because the pipe flange has generally the cross section of a segment of a sphere, only a limited portion of the split flange will bear directly thereon, allowing air to pass about a substantial portion of the surface of the pipe flange. Nevertheless, the limited metal-to-metal contact will permit heat to transfer from the pipe to the split flange which will then provide increased surface area to effect heat dissipation.

As will be readily appreciated it, many of the structures with which the present invention may be employed will include a flange on one of the pipes to be coupled in which are provided apertures for seating with the shank 16 of the fastening means. In other instances, a split flanges in accordance with the present invention can be provided about each of the pipe members to effect the assembly.

Since the clamp members will pivot about either one of the fasteners, one fastener can be removed to facilitate opening the opposite end and pivoting the open end about the pipe to locate the flange in position thereon. Thereafter the fastener can be inserted through its aperture to effect the engagement of the end which has been so opened.

As will be readily appreciated, the laminar structure of the present invention provides a high degree of strength and a large surface area for dissipation of heat. This not only improves the life characteristics of the split flange itself, but also serves to improve the life characteristics of the flange of the pipe about which it is placed since its metal-to-metal contact therewith will function to conduct heat therefrom and dissipate heat to the atmosphere.

The arcuate segments are desirably fabricated from a low carbon steel such as alloy 1008 or alloy 1010 by stamping from sheet metal having a thickness of about 0.060–0.125 inch thickness and preferably about 0.07–0.095 inch.

The number of laminae must in each clamp member equal at least 3 in order to achieve the effective results of the present invention, and preferably is at least 5. Although more than 7 may be utilized, the increase in heat dissipation characteristics is not sufficient to justify the material increasing in cost.

The fastening means utilized to secure the elements of the assembly together are desirably machine bolts having a hexagonal head and a shank of about 2–3 inches and a diameter of about $\frac{1}{4}$ to $\frac{1}{2}$ inch. The rivets used to secure the laminae together are conveniently on the order of 0.15–0.25 inch diameter and preferably about 0.19–0.21 inch.

Exemplary of the dimensioning of a highly successful split flange for use with pipes having an internal diameter of $2\frac{1}{4}$ to $2\frac{1}{2}$ inches is one fabricated from arcuate segments utilizing 1010 low carbon steel of about 0.085 inch thickness. The body portion of the arcuate segments (between the end portions) preferably utilizes an internal radius (radius for the inside curve) of about 1.31 inch and an outer radius (radius for the outside curve) of about 1.81 inch. The end-to-end longitudinal dimension of the clamp members is approximately $4\frac{1}{2}$ inches and the width of the central arcuate portion is about $\frac{1}{2}$ inch. Each of the end portions are about 1 inch of the total projecting length of the clamp member.

Thus, it can be seen from the foregoing detailed specification and drawing that the split flange of the present invention may be fabricated readily from sheet metal stock to provide a highly durable and economical structure, the flange may be readily assembled onto flanged pipes such as catalytic converters and the like to effect a secure assembly therewith. The laminar structure not only provides high strength but also excellent heat dissipation characteristics and thus contributes to the long-life of the entire assembly.

Having thus described the invention, I claim:

1. A split flange for coupling flanged elements of an exhaust system or the like comprising:

a. a pair of laminated clamp members of generally arcuate configuration and each including at least five similarly configured and dimensioned sheet metal arcuate segments disposed in overlying relationship to provide a laminate comprised of at least five sheet metal laminae, alternating segments being arcuately displaced relative to the adjacent segments so as to project beyond one end of the adjacent segments and terminate inwardly from the end of the other end of the adjacent segments which project therebeyond to provide end portions comprised of at least two of said segments at each end of said clamp member, and a plurality of fastener means spaced along the length of said sheet metal segments between said end portions and securing the overlying segments in assembly, the pair of clamp members being disposed with the arcs circumscribed thereby disposed in opposition and with the laminae of the end portions of said clamp members interfitting to provide at least five interfitting segments, said end portions of said segments being of enlarged width relative to the center thereof, said interfitting end portions of each of said clamp members having aligned apertures therein spaced inwardly from the ends of the projecting end portions of the segments providing such end portions of the clamp members and outwardly from the ends of the other segments, the configuration and dimensioning of said end portions of said segments and the spacing of said apertures therein permitting pivoting of said clamp members relative to each other about the axis of said aligned apertures; and a pair of fastening means seated in said aligned apertures of said clamp members to secure the clamp members in assembly circumscribing a generally circular space, at least one of said fastening means being releasably engageable and removable to permit the clamp members to pivot about the other of said fastening means.

2. The split flange of claim 1 wherein said fastener means securing the arcuate segments together comprise rivets.

3. The split flange of claim 1 wherein both of said fastening means are releasably engageable and removable.

* * * * *